US006631472B2

(12) United States Patent
Kaplan et al.

(10) Patent No.: US 6,631,472 B2
(45) Date of Patent: *Oct. 7, 2003

(54) KERNEL MODE PROTECTION

(75) Inventors: Michael M. Kaplan, Rockport, MA (US); Timothy Ober, Atkinson, NH (US); Peter Reed, Beverly, MA (US)

(73) Assignee: SafeNet, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/897,670

(22) Filed: Jul. 2, 2001

(65) Prior Publication Data

US 2002/0051538 A1 May 2, 2002

Related U.S. Application Data

(63) Continuation of application No. 09/154,357, filed on Sep. 16, 1998, now Pat. No. 6,282,657.
(60) Provisional application No. 60/059,082, filed on Sep. 16, 1997, and provisional application No. 60/059,843, filed on Sep. 16, 1997.

(51) Int. Cl.[7] .............................................. G06F 13/00
(52) U.S. Cl. ....................................................... 713/201
(58) Field of Search ................................. 713/200, 201, 713/202, 164, 167, 190; 411/163; 709/229; 340/825.31, 825.34; 714/9–12

(56) References Cited

U.S. PATENT DOCUMENTS

| 4,278,837 A | * | 7/1981 | Best ......................... 178/22.09 |
| 4,319,079 A | * | 3/1982 | Best ......................... 178/22.09 |
| 4,987,595 A | | 1/1991 | Marino, Jr. et al. |
| 5,483,649 A | * | 1/1996 | Kuznetsov et al. .......... 713/200 |
| 5,557,346 A | | 9/1996 | Lipner et al. |
| 5,623,545 A | | 4/1997 | Childs et al. |
| 5,631,960 A | | 5/1997 | Likens et al. |
| 5,649,159 A | * | 7/1997 | Le et al. ...................... 711/163 |
| 5,721,777 A | * | 2/1998 | Blaze .......................... 713/200 |
| 6,282,657 B1 | * | 8/2001 | Kaplan et al. ............... 713/201 |

* cited by examiner

Primary Examiner—James P. Trammell
Assistant Examiner—Pierre E. Elisca
(74) Attorney, Agent, or Firm—Gerald T. Bodner

(57) ABSTRACT

A kernel mode protection circuit includes a processor, a program counter, a kernel program fetch supervisor circuit, a kernel data fetch supervisor circuit, a program memory, a data memory, a flip-flop circuit and two AND circuits. The data memory includes two user memories, protected registers and random access memory (RAM). The program memory includes two user memories and a kernel read only memory (ROM). The circuit may operate in either a user mode (kernel ROM is not accessible) or a kernel mode (kernel ROM is accessible). When in the kernel mode the kernel RAM and certain protected registers are accessible only by a secure kernel. The kernel mode control circuit will reset the processor should a security violation occur, such as attempting to access the kernel RAM while in the user mode. The kernel program fetch supervisor circuit monitors and compares an address within the program counter to a predetermined address, stored within the kernel program fetch supervisor circuit, to determine if a security violation has occurred. The kernel data fetch supervisor circuit monitors and compares the data address to addresses defining a protected memory area. A security violation will occur if the data address is within the protected memory address range and the processor will be reset. A method of kernel mode protection includes the step of fetching a program opcode. If the program opcode is from the kernel memory, the processor is reset. If the program opcode is from a user memory, then the processor may fetch the data operand. If the data operand is fetched from the kernel memory, the processor is reset. If the data operand is fetched from a user memory, the processor is permitted to enter the kernel memory. If a program opcodes is fetched from the kernel memory the processor may continue to fetch operands from either the kernel memory or the data memory. The processor remains in kernel mode and continues to fetch program opcodes until all of the opcodes have been fetched, or until an opcode fetched is from the user memory. If an opcode fetched is from the user memory, the processor switches back to user mode.

2 Claims, 2 Drawing Sheets

KERNEL MODE PROTECTION

CROSS-REFERENCE TO RELATED APPLICATIONS

This application is a continuation of Application Ser. No. 09/154,357 filed on Sep. 16, 1998 now U.S. Pat. No. 6,282,657 and is based on Provisional Patent Application Serial Nos. 60/059,082 and 60/059,843, each of which was filed on Sep. 16, 1997, and relates to U.S. patent application Ser. No. 09/154,443 filed on Sep. 16, 1998, the disclosures of which are incorporated herein by reference.

BACKGROUND OF THE INVENTION

The present invention relates generally to kernel mode protection, and more particularly relates to an apparatus and method that enforces a security perimeter around cryptographic functions.

DESCRIPTION OF THE PRIOR ART

The concept of privileged separation of software processes is known in the art. Having one software process work in a privileged/secure environment and another software process working in an unprivileged/non-secure environment is typically controlled by the hardware within a processor. The hardware that supports privileged separation is fundamentally integrated throughout the processor mask. Integrating the hardware throughout the processor is expensive and increases the size of the processor. Smaller processors, such as digital signal processors (DSPs), do not include privileged separation hardware features. The hardware is not included in the processors to keep the size and cost of the processors down.

OBJECTS AND SUMMARY OF THE INVENTION

It is an object of the present invention to provide an apparatus and method that enforces a security perimeter around cryptographic functions.

The kernel mode protection circuit constructed in accordance with one form of the present invention includes a processor, a program counter, a kernel fetch supervisor circuit, a kernel data fetch supervisor circuit, a program memory, a data memory, a flip-flop circuit and two AND circuits. The kernel mode protection circuit may operate either in a user mode or a kernel mode. The kernel program fetch supervisor circuit monitors the address within the program counter and compares the address to a predetermined address stored within the kernel program fetch supervisor. If the addresses are equal the kernel program supervisor circuit activates a flip-flop which switches between a user mode output signal and a kernel mode output signal. The kernel data fetch supervisor circuit compares the processor data address to a predetermined protected memory address range. If the processor is in user mode and attempts to fetch data within the protected memory address range, then the kernel data fetch supervisor circuit in conjunction with the flip-flop circuit generates a processor reset signal at the AND circuit output. If the processor attempts to access a kernel memory address other than the predetermined address stored in the kernel program fetch supervisor circuit, then the kernel program fetch supervisor circuit in conjunction with the flip-flop will generate a processor reset signal at the AND circuit output.

DETAILED DESCRIPTION OF THE PREFERRED EMBODIMENTS

Figure 1:
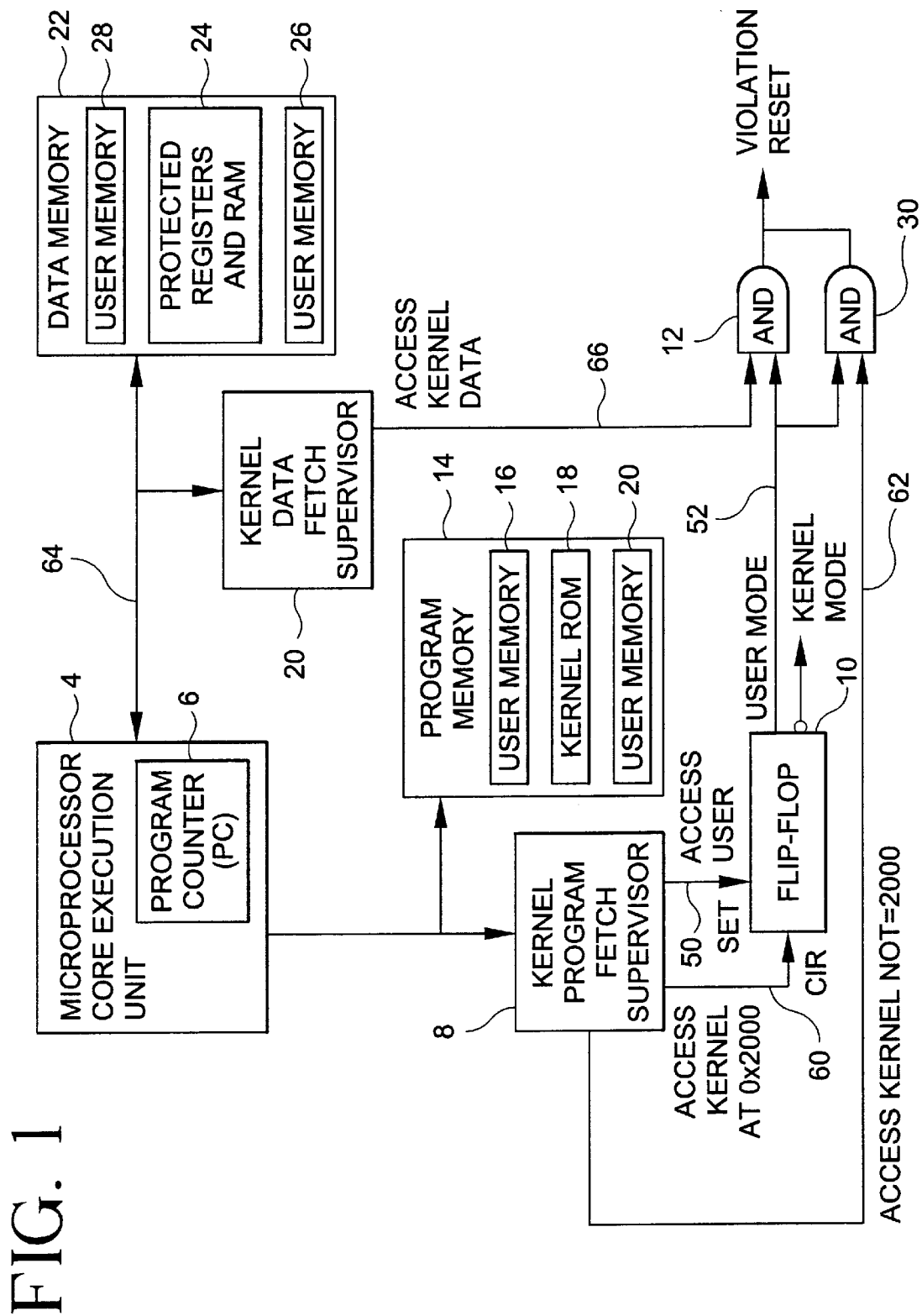
FIG. 1 is a drawing of the kernel mode protection circuit.

The kernel mode protection circuit, FIG. 1, is responsible for enforcing a hardware security perimeter around cryptographic functions. The circuit may either be operating in user mode (kernel space is not accessible) or kernel mode (kernel space is accessible) at a given time. When in the kernel mode the kernel random access memory (RAM) and certain protected registers and functions (kernel space) are accessible only to the secure kernel firmware. The kernel executes host requested macro level functions and then returns control to the calling application. The kernel mode control hardware subsystem will reset the processor should any security violation occur, such as attempting to access a protected memory location while in user mode. Any attempt by a user mode application program running on the processor to access a kernel space address other than 0x2000 will result in an immediate processor reset and all sensitive registers and memory locations will be erased. Kernel mode may only be entered via a call, jump or increment to address 0x2000. However, while in kernel mode, the processor 4 may access all program/data memory and registers.

The kernel mode protection circuit, FIG. 1, includes the following: a processor 4, a program counter circuit 6, a kernel program fetch supervisor circuit 8, a flip-flop circuit 10, an AND circuit 12, a program memory 14, a kernel data fetch supervisor circuit 20, a data memory 22 and an AND circuit 30. The program memory 14 includes a user memory 16, a kernel read only memory (ROM) 18 and a user memory 20. The data memory 22 includes a user memory 28, protected registers and random access memory (RAM) 24 and a user memory 26.

The program counter (PC) 6 is coupled to the kernel program fetch supervisor circuit 8 and the program memory 14. The program counter 6 contains the address of the current program fetch instruction. The kernel program fetch supervisor circuit 8 contains a basic comparator used to determine whether the PC 6 is set to address 0x2000 or another address range. The kernel program fetch supervisor circuit 8 is coupled to the flip-flop circuit 10 by an access user output 50 connected to the flip-flop circuit 10 set input, and an access kernel 0x2000 output 60 is coupled to the flip-flop circuit 10 clear input. The flip-flop circuit 10 has 2 outputs, a user mode output 52 and a kernel mode output 54. The kernel program fetch supervisor circuit 8 also has an access kernel not=0x2000 output 62. This output and the user mode output 52 are coupled to a standard AND circuit 30. The kernel program fetch supervisor circuit 8 operates in three states. The first state occurs when the processor 4 is in the user mode and a program fetch is from a user program memory 14. The second state occurs when the processor 4 is in the user mode and enters the kernel at address 0x2000. The third state occurs when the processor 4 is in the user mode and an application program tries to access the kernel using ROM 18, an address other than 0x2000.

The kernel data fetch supervisor circuit 20 is coupled to a data memory address bus 64 and the data memory 22. An access kernel data output signal. 66 couples the kernel data fetch supervisor circuit 20 to the AND circuit 12. The kernel data fetch supervisor circuit 20 compares the data memory address fetch to the address range of the protected registers and RAM 24. The address range is preferably 0000 through 17 FF. If the data address fetched is within the address range 0000 through 17 FF, the kernel data fetch supervisor circuit 20 asserts a logic "1" signal. In addition, if the processor 4 is in user mode (a logic "1" signal at user mode output 52), a logic "1" signal is generated from the AND circuit 12. This signal resets processor 4 since fetching data from protected memory, while in user mode, is not permitted.

The first state occurs when the processor 4 is in user mode and a program fetch is from a user program memory. The kernel program fetch supervisor circuit 8 compares the program counter 6 address to address 0x2000. If the addresses are equal, then the access user output 50 sets flip-flop 10 to kernel mode. If the addresses are not equal then the kernel program fetch supervisor circuit 8 does nothing and the processor stays in user mode.

The second state occurs when the processor 4 is in user mode and the processor 4 tries to access the kernel at address 0x2000. The kernel program fetch supervisor circuit 8, compares the address stored in the program counter 6 to address 0x2000. If they are equal, the kernel protection fetch supervisor circuit 8 activates the kernel output 60 and clears the flip-flop 10 resulting in the processor 4 switching to kernel mode.

The third state occurs when the processor 4 is in user mode and an application program tries to access the kernel at an address other than 0x2000. The kernel program fetch supervisor circuit 8 compares the address stored in the program counter 6 to the kernel address not equal 0x2000. If the address is within the kernal space but is not equal to 0x2000, then the output 62 is set to a logic "1" the flip-flop 10 to user mode.

The kernel data fetch supervisor circuit 20, compares a data address fetch to the address range of the protected registers and RAM 24. This region is of memory is preferably from address 0000 through to address 17 FF. If the data address is within this range, the kernel data fetch supervisor circuit 20 sets an output logic "1" signal on the access kernel data output 66.

User mode output 52 is coupled to the AND circuit 12 input and the AND circuit 30 input. The access kernel not=2000 output 62 is coupled to the AND circuit 30. The access kernel data output 66 is also coupled to the AND circuit 12.

When the processor 4 is in user mode, the kernel program fetch supervisor circuit 8 is in the access user state. This state sets the user mode output 52 to a logic "1" signal. If the processor 4 attempts to access an address other than 0x2000, the kernel program fetch supervisor circuit 8 generates an output logic "1" signal on the access kernel not=2000 output 62. Jumping from user mode to kernel mode, using an address other than 0x2000, is an illegal operation (violation of the security features). These signals, when applied to the AND circuit 30, result in a logic "1" signal at the AND circuit 30 output which resets the processor.

If the processor 4 is in the user mode and is then put into kernel mode at address 0x2000, the kernel program fetch supervisor circuit 8 clears the flip-flop 10 and applies a logic "1" signal to the access kernel output 60. The flip-flop 10 also applies a logic "0" signal to the user mode output 52, which disables the AND circuits 12 and 30. These circuits are disabled to prevent the reset signal from being generated, because accessing the kernel at address 0x2000 from user mode is permitted.

Access kernel data output 66 and user mode output 52 are coupled to the AND circuit 12 inputs. If the processor 4 is in the user mode, the user mode output 52 is a logic "1" signal. If the processor 4 tries to access data within the protected data memory range, then a logic "1" signal is generated on the access kernel data output 66 and the AND circuit 12 generates a reset signal which resets the processor 4. The processor 4 is reset because fetching data from protected registers and RAM 24, while in user mode, is an illegal operation. However, while the processor 4 is in kernel mode, the data fetch is permitted to be from anywhere within the data memory 22. A logic "0" signal is generated on the user mode output 52. This disables the AND circuit 12, which prevents the processor from being reset.

Figure 2:
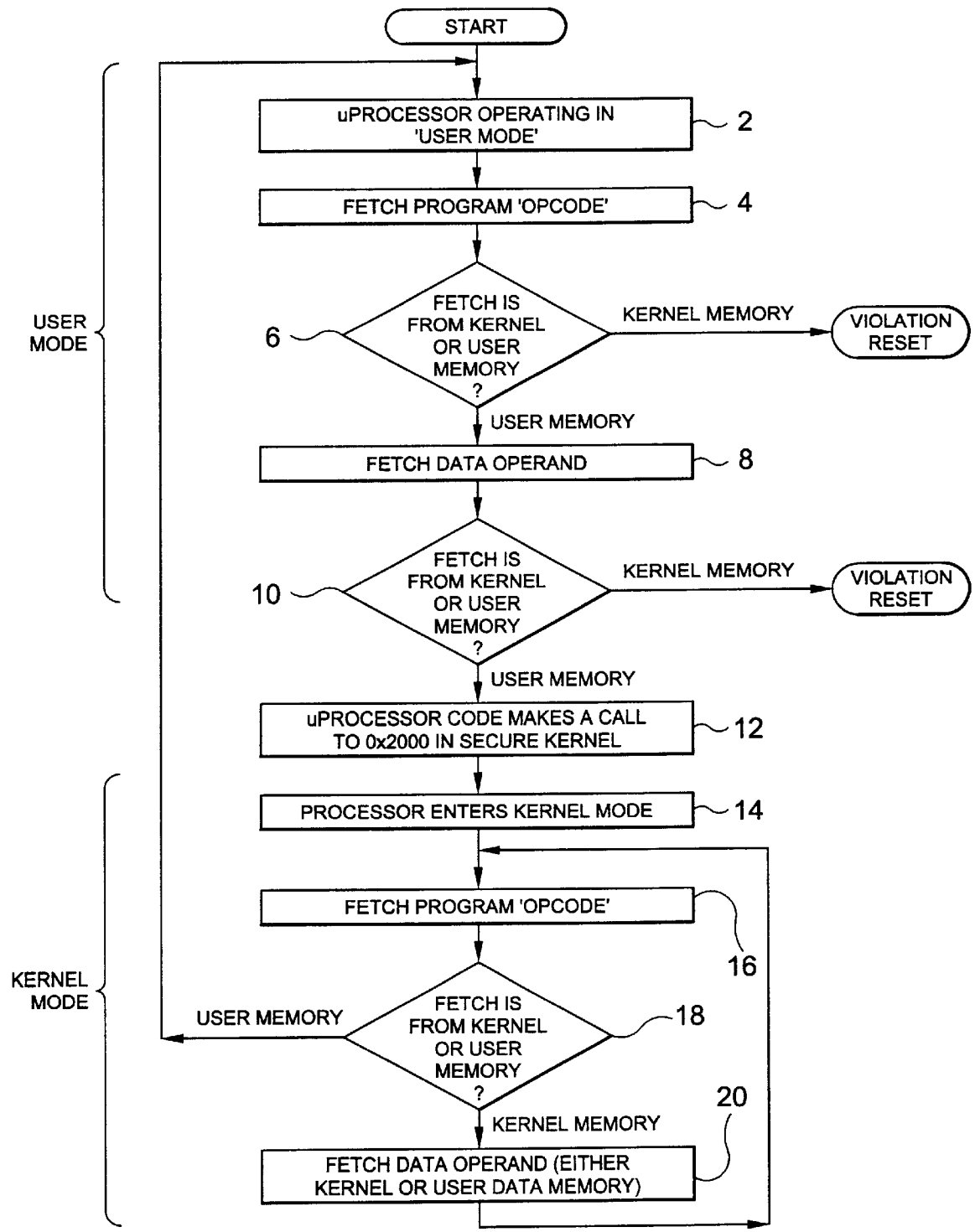
FIG. 2 is a flow chart of a method of kernel mode protection.

A flowchart of a method of kernel mode protection is shown in FIG. 2. The method starts with the processor operating in user mode (Block 2). An application program operating outside of the kernel is considered to be operating in the user mode. While in user mode, the application program fetches program opcodes (Block 4). The number of opcodes fetched depend upon the particular application program that is running. Each opcode fetch is checked whether it was fetched from kernel memory or application memory (Block 6). If the opcode fetch is from the kernel memory, this is a violation and the processor is reset. If the opcode fetch is from user memory, the process continues. Each data operand fetch is monitored by the secure kernel (Block 8). If the data operand fetch is from kernel memory then the processor 4 is reset (Block 10). If it is from user memory the process continues. When the processor code makes a call to address 0x2000 it enters the secure kernel and switches to kernel mode (Block 12 & 14). While in kernel mode, all program fetch opcodes are also monitored (Block 16). If the opcode fetch is from kernel memory, block 16, then the data operand may also be fetched from either kernel or user data memory (Block 18 & 20). This process continues until the application is complete or if an opcode fetch is from user memory (Block 16 & 18). If the opcode fetch is from user memory the processor switches back to user mode (Block 2).

What is claimed is:

1. A controller circuit for switching between a user mode and a kernel mode in a processor comprising;

a processor;

a program counter electrically connected to the processor for monitoring program fetch addresses;

a kernel program fetch supervisor circuit having a predetermined address value stored within, the kernel program fetch supervisor circuit being electrically connected to the program counter for comparing the address in the program counter to the predetermined address value stored within the kernel program fetch supervisor circuit;

a program memory electrically connected to the program counter;

a sequential circuit electrically connected to the kernel program fetch supervisor circuit for switching between setting a user mode bit and a kernel mode bit;

a kernel data fetch supervisor circuit electrically connected to the processor for comparing a data fetch address to a memory address range;

a data memory electrically connected to a processor data interface for storing data;

a first AND circuit coupled to the sequential circuit and the kernel data fetch supervisor circuit for activating and deactivating a violation reset signal;

and a second AND circuit coupled to the first AND circuit and the kernel program fetch supervisor circuit for activating and deactivating the violation reset signal.

2. A method of monitoring and controlling program fetch addresses and data fetch addresses in a processing circuit to control access to a protected memory comprising the steps of:

fetching a program opcode;

reading a program opcode address associated with the program opcode;

determining whether the program opcode address is fetched from one of a protected program memory address and an unprotected program memory address;

resetting the processing circuit when the program opcode is fetched from the protected program memory address;

fetching a data operand when the program opcode address is fetched from the unprotected program memory address;

reading a data operand address associated with the data operand;

determining whether the data operand address is fetched from one of a protected data memory address and an unprotected data memory address;

resetting the processing circuit when the data operand is fetched from the protected data memory address;

calling a starting address of the protected program memory when the data operand address is fetched from the unprotected data memory;

fetching a second program opcode;

reading a second program opcode address associated with the second program opcode;

determining whether the second program opcode address is fetched from one of the protected program memory address and the unprotected program memory address;

fetching a third program opcode when the second program opcode address is fetched from the unprotected memory address; and fetching a second data operand when the second program opcode address is fetched from the protected memory address.

* * * * *